United States Patent
Heo (10) Patent No.: US 10,447,932 B2
(45) Date of Patent: Oct. 15, 2019

(54) DRIVING APPARATUS FOR VOICE COIL MOTOR

(71) Applicant: SAMSUNG ELECTRO-MECHANICS CO., LTD., Suwon-si (KR)

(72) Inventor: Chang Jae Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 93 days.

(21) Appl. No.: 15/808,032

(22) Filed: Nov. 9, 2017

(65) Prior Publication Data

US 2018/0352161 A1    Dec. 6, 2018

(30) Foreign Application Priority Data

May 31, 2017    (KR) .................. 10-2017-0067796

(51) Int. Cl.
*H04N 5/232*    (2006.01)
*H04N 5/225*    (2006.01)

(52) U.S. Cl.
CPC ....... *H04N 5/23287* (2013.01); *H04N 5/2257* (2013.01)

(58) Field of Classification Search
CPC ................................. H04N 5/23287
USPC .................................. 348/208.11
See application file for complete search history.

(56) References Cited

U.S. PATENT DOCUMENTS

| 7,224,135 B1 | 5/2007 | Menegoli | |
|---|---|---|---|
| 2012/0049829 A1* | 3/2012 | Murakami | H02M 1/32 323/288 |

FOREIGN PATENT DOCUMENTS

| JP | 2007-74835 A | 3/2007 |
|---|---|---|
| KR | 10-2016-0126915 A | 11/2016 |

OTHER PUBLICATIONS

Korean Office Action dated Sep. 28, 2018 in corresponding Korean Patent Application No. 10-2017-0067796 (4 pages in English and 4 pages in Korean).
Korean Office Action dated Mar. 21, 2018 in corresponding Korean Patent Application No. 10-2017-0067796 (4 pages in English and 4 pages in Korean).

\* cited by examiner

*Primary Examiner* — Joel W Fosselman
(74) *Attorney, Agent, or Firm* — NSIP Law (57) ABSTRACT

A driving apparatus for a voice coil motor includes a signal generator configured to generate a path signal determining a path of a driving current provided to the voice coil motor and a current signal determining a level of the driving current, a controller configured to generate a control signal by comparing a reference current determined by the current signal, with the driving current flowing in the voice coil motor, and a driving circuit unit including transistors connected to the voice coil motor, the transistors being configured to form the path of the driving current by performing a switching operation based on the path signal and the control signal.

16 Claims, 5 Drawing Sheets

FIG. 5

DRIVING APPARATUS FOR VOICE COIL MOTOR

CROSS-REFERENCE TO RELATED APPLICATION(S)

This application claims the benefit under 35 USC § 119(a) of Korean Patent Application No. 10-2017-0067796 filed on May 31, 2017 in the Korean Intellectual Property Office, the entire disclosure of which is incorporated herein by reference for all purposes.

BACKGROUND

1. Field

The present disclosure relates to a driving apparatus for a voice coil motor.

2. Description of Related Art

Recently, camera modules have been provided with actuators having an autofocusing function and an optical image stabilization (OIS) function. An H bridge circuit capable of being bidirectionally driven may be provided in an actuator, such that the actuator may perform an autofocusing function and the optical image stabilization (OIS) function using a voice coil motor.

With the demand for the miniaturization of portable terminals containing camera modules, attempts are being made to decrease an area of an H bridge circuit in the actuator.

In an example, Korean Patent Laid-Open Publication No. 10-2016-0126915 provides a driving apparatus for a voice coil motor allowing for the miniaturization of an actuator by removing a separate transistor and a resistor for detecting a voltage of the voice coil motor from an H bridge circuit. Since an output current (I_VCM) is changed by a load of the voice coil motor and cannot be represented by Equation 2 in paragraph [0032] of Korean Patent Laid-Open Publication No. 10-2016-0126915, it is not possible to precisely control the voice coil motor.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed.

In one general aspect, there is provided a driving apparatus for a voice coil motor including a signal generator configured to generate a path signal determining a path of a driving current provided to the voice coil motor and a current signal determining a level of the driving current, a controller configured to generate a control signal by comparing a reference current determined by the current signal, with the driving current flowing in the voice coil motor, and a driving circuit unit including transistors connected to the voice coil motor, the transistors being configured to form the path of the driving current by performing a switching operation based on the path signal and the control signal.

The driving circuit unit may be configured to generate the driving current by mirroring the reference current.

The controller may include a current providing transistor configured to perform a switching operation based on the path signal, and a current source configured to generate the reference current based on the switching operation of the current providing transistor.

The ratio of the reference current to the driving current may be determined based on a ratio of a size of the current providing transistor to a size of one of the transistors.

The controller may be configured to uniformly maintain a potential difference across the transistor receiving the path signal among the transistors and a potential difference across the current providing transistor.

The controller may include an operational amplifier including an inverting terminal and a non-inverting terminal, and the inverting terminal may be connected to one of the current source and the voice coil motor, and the non-inverting terminal may be connected the other of the current source and the voice coil motor.

The operational amplifier may be configured to generate the control signal based on voltages of the inverting terminal and the non-inverting terminal.

The controller may include a blocking transistor blocking the control signal by performing a switching operation based on the path signal.

A path of the driving current may be determined by two transistors among the transistors, and one of the two transistors receiving the path signal, and the other transistor receiving the control signal.

In another general aspect, there is provided a driving apparatus for a voice coil motor, including a signal generator configured to generate a path signal determining a path of a driving current provided to the voice coil motor and a current signal determining a level of the driving current, a controller configured to generate a control signal from a reference current determined by the current signal, and a driving circuit unit including transistors connected to the voice coil motor, the transistors forming the path of the driving current by performing a switching operation based on the path signal and the control signal, wherein the controller may be further configured to uniformly maintain a potential of a node in which the reference current flows, and a potential of a connection node between a transistor receiving the path signal among the transistors and the voice coil motor.

The driving circuit unit may be configured to generate the driving current by mirroring the reference current.

The controller may include a current providing transistor configured to perform a switching operation based on the path signal, and a current source configured to generate the reference current based on the switching operation of the current providing transistor.

A ratio of the reference current to the driving current may be determined based on a ratio of a size of the current providing transistor to a size of one of the transistors.

The controller may include an operational amplifier including an inverting terminal and a non-inverting terminal, the inverting terminal may be connected to one of the current source and the voice coil motor, and the non-inverting terminal may be connected the other of the current source and the voice coil motor.

The operational amplifier may be configured to generate the control signal based on voltages of the inverting terminal and the non-inverting terminal.

The controller may include a blocking transistor performing a switching operation based on the path signal to block the control signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for the purposes of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. As used herein, the term "and/or" includes any one and any combination of any two or more of the associated listed items.

Due to manufacturing techniques and/or tolerances, variations of the shapes shown in the drawings may occur. Thus, the examples described herein are not limited to the specific shapes shown in the drawings, but include changes in shape that occur during manufacturing.

All documents cited in the present disclosure, including published documents, patent applications, and patents, may be incorporated herein in their entirety by reference in the same manner as when each cited document is separately and specifically incorporated or incorporated in its entirety.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
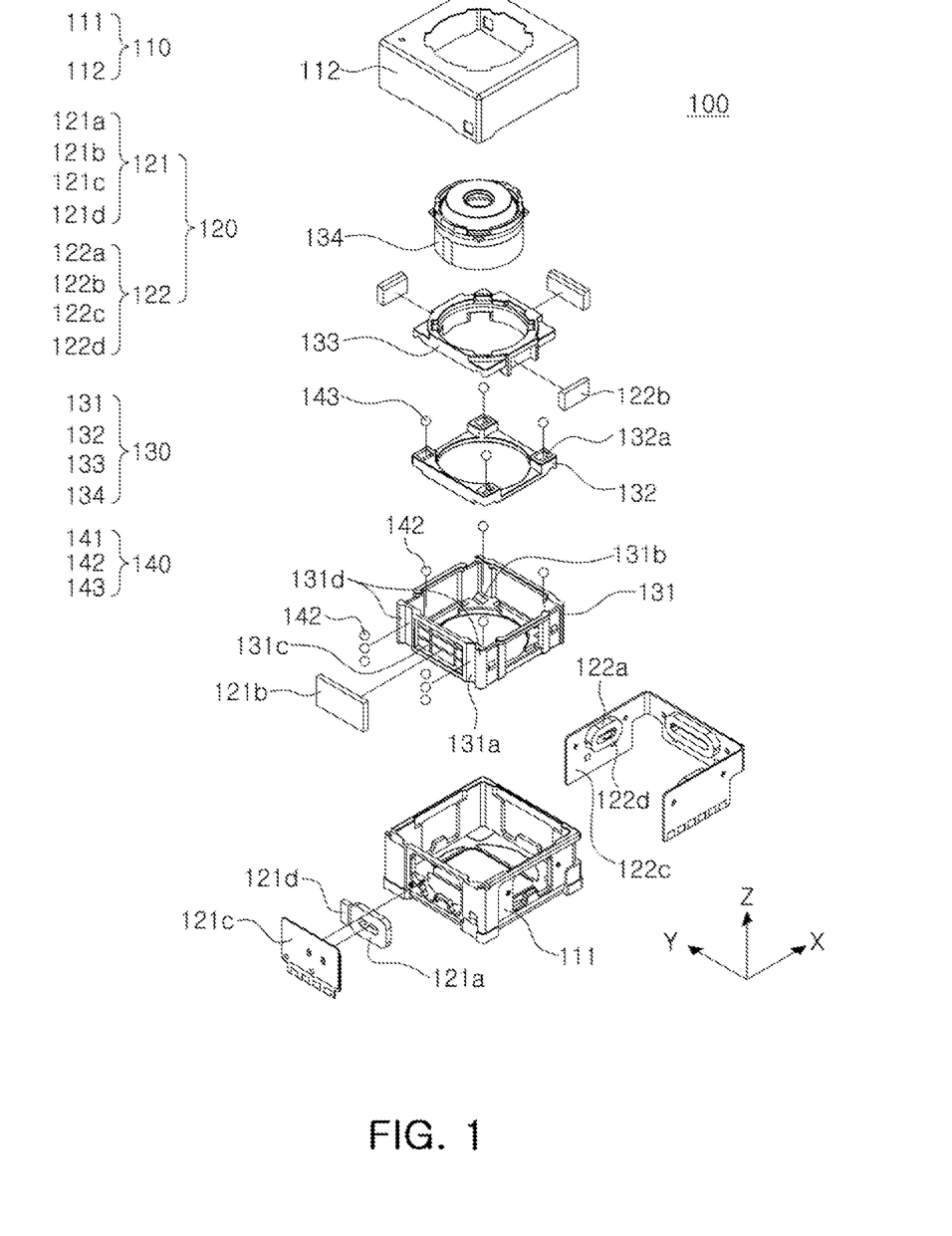
FIG. 1 is an diagram illustrating an example of a camera module.

FIG. 1 is a diagram illustrating an example of a camera module.

Referring to FIG. 1, a camera module 100 includes a housing unit 110, an actuator 120, and a lens module 130, and a bearing member 140.

In an example, the camera module 100 has at least one of an autofocusing function and an optical image stabilization (01P) function. In an example, in the camera module 100, the lens module 130 move, in the housing unit 110, in an optical axis direction and a direction perpendicular to an optical axis, respectively, to perform autofocusing and the optical image stabilization.

In an example, the housing unit 110 includes a housing 111 and a shield case 112. In an example, the housing 111 is formed of a material that is easy to shape, such as, for example, a plastic material. At least one actuator 120 may be mounted in the housing 111. For example, a portion of a first actuator 121 is mounted on a first side surface of the housing 111, and portions of a second actuator 122 is mounted on second to fourth side surfaces of the housing 111. In an example, the housing 111 accommodates the lens module 130. In an example, a space is formed in the housing 111, which accommodates the lens module 130, either completely or partially.

In an example, six surfaces of the housing 111 are open. For example, a hole for an image sensor may be formed in a bottom surface of the housing 111, and a square hole for mounting the lens module 130 may be formed in a top surface of the housing 111. Further, the first side surface of the housing 111 may be open so that a first voice coil motor 121a of the first actuator 121 may be inserted, and the second to fourth side surfaces of the housing 111 may be open so that a second voice coil motor 122a of the second actuator 122 may be inserted.

In an example, the shield case 112 covers a portion of the housing 111. For example, the shield case 112 may cover the top surface and four side surfaces of the housing 111. In another example, the shield case 112 covers only four side surfaces of the housing 111 or partially cover the top surface and four side surfaces of the housing 111. The shield case 112 may shield electromagnetic waves generated at the time of driving the camera module, i.e., electromagnetic waves that are generated in the camera module at the time of driving the camera module. When the electromagnetic waves are emitted externally or to the outside of the camera module, the electromagnetic waves affect other electronic components, which cause communications errors or malfunctions. To prevent this, in an example, the shield case 112 is formed of a metal material and grounded to a ground pad of a substrate mounted below the housing 111, thereby shielding the electromagnetic waves. When the shield case 112 is formed of a plastic injection product, a conductive paint may be applied to an inner surface of the shield case 112 or a conductive film or conductive tape may be attached to the inner surface of the shield case 112, thereby shielding the electromagnetic waves. In an example, a conductive epoxy may be used as the conductive paint, but the conductive paint is not limited thereto, and various materials having conductivity are considered to be well within the scope of the present disclosure.

In an example, a plurality of actuators 120 may be provided. In an example, the actuator 120 includes a first actuator 121 moving the lens module 130 in a Z-axis direction and a second actuator 122 moving the lens module 130 in an X-axis direction and a Y-axis direction.

The first actuator 121 may be mounted in the housing 111 and a first frame 131 of the lens module 130. For example, a portion of the first actuator 121 may be mounted on the first side surface of the housing 111, and the other portion of the first actuator 121 may be mounted on a first side surface of the first frame 131. The first actuator 121 may move the lens module 130 in the optical axis direction (the Z-axis direction). In an example, the first actuator 121 includes a first voice coil motor 121a, a first magnet 121b, a first substrate 121c, and a first position detector 121d. In an example, the first voice coil motor 121a and the first position detector 121d is formed on the first substrate 121c. In an example, the first substrate 121c is mounted on the first side surface of the housing 111, and the first magnet 121b is mounted on the first side surface 131c of the first frame 131 facing the first substrate 121c.

A first driving apparatus (not illustrated) providing a driving signal to the first voice coil motor 121a may be provided in the first substrate 121c. The first driving apparatus may apply the driving signal to the first voice coil motor 121a to provide driving force to the first magnet 121b. In an example, the first driving apparatus includes a driver integrated circuit (driver IC) providing the driving signal to the first voice coil motor 121a. When the driving signal is provided by the first driving apparatus to the first voice coil motor 121a, a magnetic flux is generated in the first voice coil motor 121a, and the magnetic flux generated in the first voice coil motor 121a interacts with a magnetic field of the first magnet 121b, thereby generating driving force enabling relative movement of the first frame 131 and a lens barrel 134 with respective to the housing according to the Fleming's left hand rule. In an example, an H bridge circuit capable of being bidirectionally driven is provided in the first driving apparatus, such that the first driving apparatus may apply the driving signal to the first voice coil motor 121a.

In an example, the lens barrel 134 is moved in the same direction as that of the first frame 131 by movement of the first frame 131. In an example, the first actuator 121 senses an intensity of the magnetic field by the first magnet 121b by the first position detector 121d to detect positions of the first frame 131 and the lens barrel 134. In an example, the first position detector 121d includes a hall sensor.

In an example, the second actuator 122 is mounted in the housing 111 and a third frame 133 of the lens module 130. In an example, portions of the second actuator 122 is mounted on the second to fourth side surfaces of the housing 111, and the other portions of the second actuator 122 is mounted on second to fourth side surfaces of the third frame 133. The second actuator 122 may be mounted on a portion of the first to fourth side surfaces of the housing 111 and the third frame 133, and may also be mounted on second to fourth corners at which the second and fourth side surfaces come into contact with each other.

The second actuator 122 moves the lens module 130 in the direction perpendicular to the optical axis. In an example, the second actuator 122 may include a plurality of voice coil motors 122a, a plurality of second magnets 122b, a second substrate 122c, and at least one second position detector 122d.

In an example, the plurality of second voice coil motors 122a and at least one position detector 122d is formed on the second substrate 122c. The second substrate 122c is formed to have a substantially tetragonal shape of which one side is open, and is mounted to enclose the second to fourth side surfaces of the housing 111. In an example, the plurality of second magnets 122b is mounted on the second to fourth side surfaces of the third frame 133, respectively, so as to face the second substrate 122c.

A second driving apparatus (not illustrated) providing a driving signal to the second voice coil motor 122a may be provided in the second substrate 121c. In an example, the second driving apparatus applies the driving signal to the second voice coil motor 122a to provide driving force to the second magnet 122b. In an example, the second driving apparatus includes a driver integrated circuit (driver IC) providing the driving signal to the second voice coil motor 122a. When the driving signal from the second driving apparatus is provided to the second voice coil motor 122a, magnetic flux is generated in the second voice coil motor 122a, and the magnetic flux generated in the second voice coil motor 122a interacts with a magnetic field of the second magnet 122b. The second driving apparatus may change an intensity and a direction of magnetic force generated between the plurality of second voice coil motors 122a and the plurality of second magnets 122b to enable relative movement of the second or third frame 132 or 133 with respect to the first frame 131. An H bridge circuit capable of being bidirectionally driven may be provided in the second driving apparatus, such that the second driving apparatus applies the driving signal to the second voice coil motor 122a.

In an example, the lens barrel 134 is moved in the same directions as that of the second or third frame 132 or 132 by movement of the second or third frame 132 or 133. The second actuator 122 may sense an intensity of the magnetic field by the second magnet 122b by the second position detector 122d to detect positions of the lens barrel 134 and the second and third frames 132 and 133. In an example, the second position detector 122d may include a hall sensor.

The lens module 130 may be mounted in the housing unit 110. In an example, the lens module 130 may be accommodated in an accommodation space formed by the housing 111 and the shield case 112 so as to move in at least three axis directions. The lens module 130 may be composed of a plurality frames. In an example, the lens module 130 may include the first frame 131, the second frame 132, and the third frame 133.

In an example, the first frame 131 moves with respect to the housing 111. In an example, the first frame 131 may move in the optical axis direction of the housing 111 (the Z-axis direction) by the above-mentioned first actuator 121. A plurality of guide grooves 131a and 131b are formed in the first frame 131. In an example, a first guide groove 131a extended to be elongated in the optical axis direction (the Z-axis direction) is formed in the first side surface of the first frame 131, and second guide grooves 131b extended to be elongated in a first direction (the Y axis direction) perpendicular to the optical axis is formed in four corners of an inner bottom surface of the first frame 131, respectively. In an example, the first frame 131 is manufactured so that at least three side surfaces thereof are open. In an example, the second to fourth side surfaces of the first frame 131 may be open so that the second magnets 122b of the third frame 133 and the second voice coil motors 122a of the housing 111 face each other.

In an example, the second frame 132 is mounted in the first frame 131. In an example, the second frame 132 is mounted in an internal space of the first frame 131. In an example, the second frame 132 may moves in the first direction (the Y-axis direction) perpendicular to the optical axis with respect to the first frame 131. In an example, the second frame 132 may move in the first direction (the Y-axis direction) perpendicular to the optical axis along the second guide grooves 131b of the first frame 131. In an example, a plurality of guide grooves 132a are formed in the second frame 132. In an example, four third guide grooves 132a extended to be elongated in a second direction (the X-axis direction) perpendicular to the optical axis may be formed in corners of the second frame 132.

In an example, the third frame 133 is mounted in the second frame 132. In an example, the third frame 133 is mounted on an upper surface of the second frame 132. In an example, the third frame 133 moves in the second direction (the X-axis direction) perpendicular to the optical axis with respect to the second frame 132. In an example, the third frame 133 moves in the second direction (the X-axis direction), perpendicular to the optical axis along the third guide grooves 132a of the second frame 132. The plurality of second magnets 122b may be mounted on the third frame 133. In an example, at least two second magnets 122b may be mounted on the second to fourth side surfaces of the third frame 133, respectively. In an example, three second magnets 122b may be mounted on the second to fourth side surfaces of the third frame 133, respectively. In another example, the third frame 133 may be formed integrally with the second frame 132. In this case, the third frame 133 may be omitted, and the second frame 132 may move in the first direction (the Y-axis direction) and the second direction (the X-axis direction) perpendicular to the optical axis.

The lens module 130 includes the lens barrel 134. In an example, the lens module 130 may include a lens barrel 134 including one or more lenses. The lens barrel 134 may have a hollow cylindrical shape to accommodate at least one lens for capturing an image of a subject, and the lens may be provided in the lens barrel 134 on the optical axis. The number of lenses stacked in the lens barrel 134 may be varied depending on a design of the lens barrel 134, and the respective lenses may have optical characteristics such as, for example, same refractive index or different refractive indices.

In an example, the lens barrel 134 may be mounted in the third frame 133. In an example, the lens barrel 134 is inserted into the third frame 133 to move integrally with the third frame 133. The lens barrel 134 may move in the optical axis direction (the Z-axis direction) and the directions (the X-axis and Y-axis directions) perpendicular to the optical axis. In an example, the lens barrel 134 is moved in the optical axis direction (the Z-axis direction) by the first actuator 121 and is moved in the directions (the X-axis and Y-axis directions) perpendicular to the optical axis by the second actuator 122.

In an example, a ball bearing member 140 guides movement of the lens module 130. In an example, the ball bearing member 140 may allow the lens module 130 to move smoothly in the optical axis direction and the directions perpendicular to the optical axis. In an example, the ball bearing member 140 includes a first ball bearing 141, a second ball bearing 142, and a third ball bearing 143. In an example, the first ball bearing 141 is disposed in the first guide groove 131a of the first frame 131 to allow the first frame 131 to move smoothly in the optical axis direction. In another example, the second ball bearing 142 is disposed in the second guide groove 131b of the first frame 131 to allow the second frame 132 to move smoothly in the first direction perpendicular to the optical axis. In another example, the third ball bearing 143 is disposed in the third guide groove 132a of the second frame 132 to allow the third frame 133 to move smoothly in the second direction perpendicular to the optical axis.

Each of the first and second ball bearings 141 and 142 may include at least three balls, and at least three balls of each of the ball bearings may be disposed in the first or second guide grooves 131a or 132b, respectively.

In an example, a lubricating material for decreasing friction and noise is filled in all sections in which the ball bearing member 140 is disposed. In an example, a viscous fluid may be injected into each of the guide grooves 131a, 131b, and 132a. As the viscous fluid, grease having excellent viscosity and lubricating properties may be used.

Figure 2:
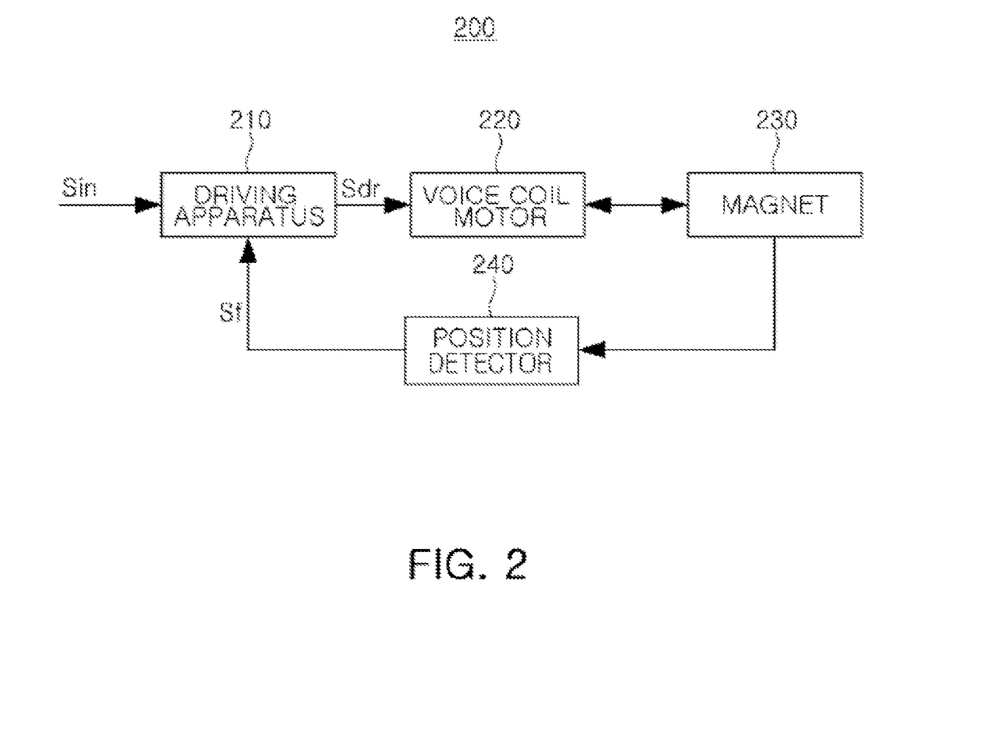
FIG. 2 is a diagram illustrating an example of some parts of an actuator used in the camera module.

FIG. 2 is a diagram illustrating some parts of an actuator used in the camera module. An actuator 200 according to the embodiment illustrated in FIG. 2 may correspond to the first and second actuator 121 and 122 of FIG. 1.

The actuator 200 of FIG. 2 corresponds to the first actuator 121 of FIG. 1, the actuator 200 moves a lens barrel in an optical axis direction to perform an autofocusing (AF) function of a camera module. When the actuator 200 of FIG. 2 performs the autofocusing function, a driving apparatus 210 applies a driving signal to a voice coil motor 220 to provide driving force to a magnet 230 in the optical axis direction.

When the actuator 200 of FIG. 2 corresponds to the second actuator 122 of FIG. 1, the actuator 200 may move the lens barrel in a direction perpendicular to an optical axis to perform an optical image stabilization (OIS) function of the camera module. When the actuator 200 of FIG. 2 performs the optical image stabilization (OIS) function, the driving apparatus 210 applies a driving signal to the voice coil motor 220 to provide driving force to the magnet 230 in the direction perpendicular to the optical axis.

In an example, the actuator 200 includes the driving apparatus 210, the voice coil motor 220, the magnet 230, and a position detector 240.

In an example, the driving apparatus 210 generates a driving signal Sdr depending on an input signal Sin input from the outside and a feedback signal Sf generated from the position detector 240, and provides the generated driving signal Sdr to the voice coil motor 220. In an example, a target position of the lens barrel is determined by the input signal Sin.

When the driving signal Sdr provided by the driving apparatus 210 is applied to the voice coil motor 220, the lens barrel is moved in one direction by electromagnetic interactions between the voice coil motor 220 and the magnet 230. The position detector 240 detects a current position of a moving magnet 230 by the electromagnetic interaction between the magnet 230 and the voice coil motor 220 to generate the feedback signal Sf, and to provide the feedback signal Sf to the driving apparatus 210.

When the feedback signal Sf is provided to the driving apparatus 210, in an example, the driving apparatus 210 compares the input signal Sin and the feedback signal Sf to generate the driving signal Sdr. In an example, the driving apparatus 210 is a closed-loop type driving apparatus driven while comparing the input signal Sin and the feedback signal Sf. The closed-loop type driving apparatus 210 is driven to decrease an error between a target position included in the input signal Sin and a current position judged by the feedback signal Sf. A closed-loop type driving method has advantages in that linearity, accuracy, and repeatability are improved as compared to an open loop system method.

An H bridge circuit capable of being bidirectionally driven may be provided in the driving apparatus 210, such that the driving apparatus 210 may apply the driving signal to the voice coil motor 220.

Figure 3:
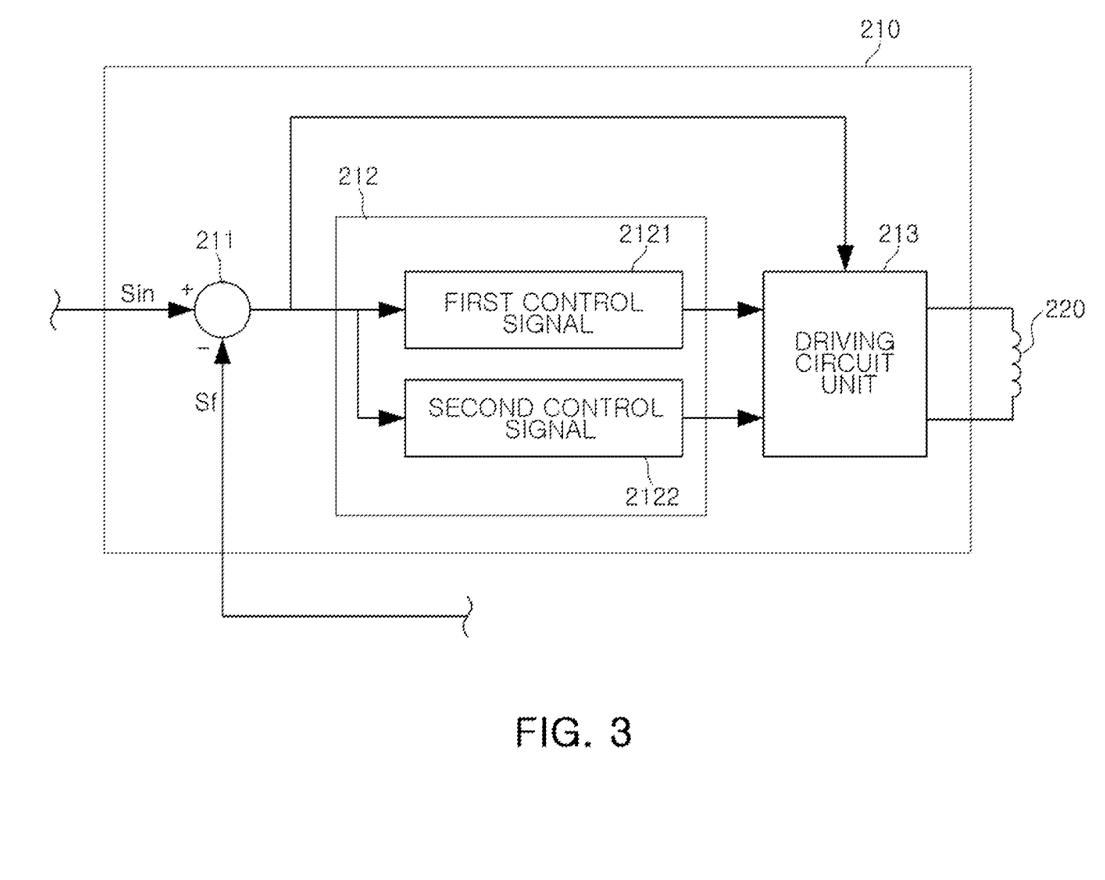
FIG. 3 is a diagram illustrating an example of a driving apparatus in FIG. 2.

FIG. 3 is a diagram illustrating an example of the driving apparatus in FIG. 2. In an example, the driving apparatus of FIG. 3 is implemented by a driver integrated circuit (driver IC).

Referring to FIG. 3, the driving apparatus 210 includes a signal generator 211, a controller 212, and a driving circuit unit 213.

In an example, the signal generator 211 generates a path signal and a current signal from the input signal Sin and the feedback signal Sf generated from the position detector 240. In an example, a direction signal and a target signal corresponds to signal components included in the input signal Sin of FIG. 3. The signal generator 211 generates a path signal determining a driving path of the voice coil motor from the direction signal. As an example, the path signal includes a first path signal and a second path signal, which determine paths that are different from each other. Further, the signal generator 211 compares a target signal indicating a target position of the lens barrel and the feedback signal Sf indicating a current position of the lens barrel to produce a current signal determining a level of a driving current. Therefore, a movement direction and a movement distance of the lens barrel may be determined by the path signal and the current signal produced in the signal generator 211.

In an example, the controller 212 generates a control signal depending on the path signal and the current signal provided by the signal generator 211. In an example, the controller 212 includes first and second control circuits 2121 and 2122. The first and second control circuits 2121 and 2122 operate selectively depending on the path signal provided by the signal generator 211 to generate the control signal.

In an example, the driving circuit 213 generates a driving signal depending on the path signal provided by the signal generator 211 and the control signal provided by the controller 212. The driving signal may be provided to both ends of the voice coil motor 220 in a form of at least one of a current and a voltage. The lens barrel may move to the target position by the driving signal generated in the driving circuit 213.

The H bridge circuit capable of being bidirectionally driven is provided in the driving circuit unit 213, such that the driving circuit unit 213 applies the driving signal to the voice coil motor 220. In an example, the H bridge circuit includes a plurality of transistors connected to both ends of the voice coil motor in an H bridge form. In a case in which the driving circuit unit 213 is driven by a voice coil motor system, the control signal provided by the controller 212 is applied to a gate of the transistor provided in the H bridge circuit.

Figure 4:
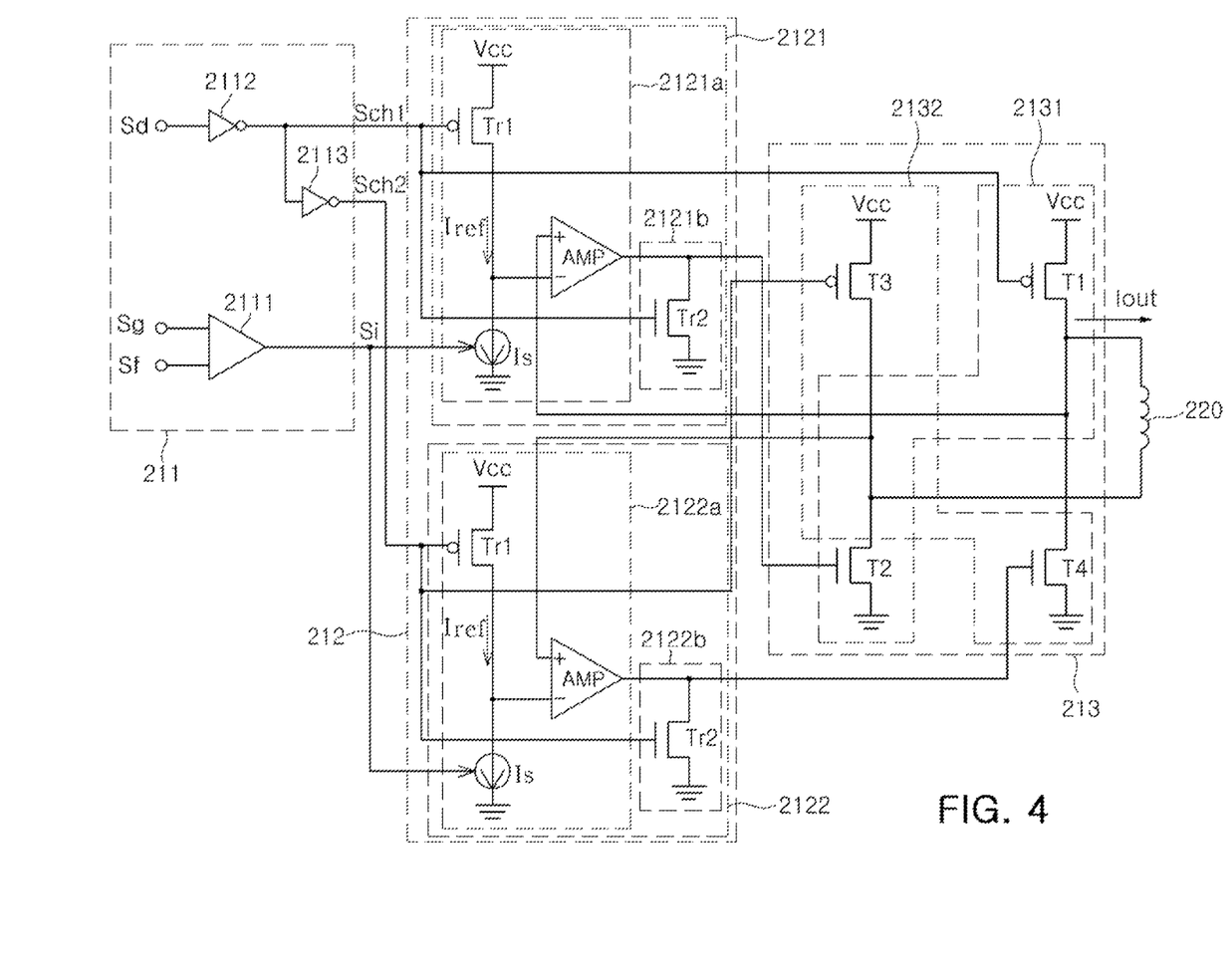
FIG. 4 is a diagram illustrating an example of a circuit diagram of a driving apparatus.

FIG. 4 is a circuit diagram illustrating an example of the driving apparatus.

In an example, the signal generator 211 includes a comparator 2111 and one or more inverters 2112 and 2113. The comparator 2111 may compare a target signal Sg and the feedback signal Sf generated from the position detector 240 to generate a current signal Si. In an example, the current signal Si is provided to a current source Is of the first and second control circuits 2121 and 2122 as described below, thereby determining a current level of a reference current.

One or more inverters 2112 and 2113 may generate first and second path signals Sch1 and Sch2 from the direction signal Sd. In an example, the first inverter 2112 inverts the direction signal Sd to generate the first path signal Sch1, and the second inverter 2113 inverts the first path signal Sch1 to generate the second path signal Sch2. Therefore, the first and second path signals Sch1 and Sch2 may have different levels from each other. As an example, when a level of the first path signal Sch1 is high, a level of the second path signal Sch2 may be low, when the level of the first path signal Sch1 is low, the level of the second path signal Sch2 may be high. In an example, the path signal generated in the signal generator 211 is provided to the controller 212 and the driving circuit unit 213.

In an example, the controller 212 includes the first and second control circuits 2121 and 2122. Each of the first and second control circuits 2121 and 2122 operate selectively depending on the first and second path signals Sch1 and Sch2 provided by the signal generator 211 to generate first and second control signals. The first path signal Sch1 may be provided to the first control circuit 2121, and the second path signal Sch2 may be provided to the second control circuit 2122.

In an example, when the level of the first path signal Sch1 is low, the first control circuit 2121 may generate the first control signal, and when the level of the second path signal Sch2 is low, the second control circuit 2122 may generate the second control signal. As an example, the levels of the first and second control signals may be high.

The driving circuit unit 213 may include a plurality of transistors connected to the voice coil motor in a form of the H shape. In an example, the driving circuit unit 213 may include a first path transistor unit 2131 and a second path transistor unit 2132.

In an example, the first path transistor unit 2131 includes first and second transistors T1 and T2. In an example, the first transistor T1 is disposed between a driving power supply Vcc and one end of the voice coil motor 220, and the second transistor T2 is disposed between the other end of the voice coil motor 220 and a ground.

In an example, the first path signal Sch1 and first control signal is provided to the first path transistor unit 2131, and the first path transistor unit 2131 may form a first path of a driving current applied to the voice coil motor 220 depending on the first path signal Sch1 and the first control signal. In an example, the first path signal Sch1 is provided to a gate of the first transistor T1, and the first control signal is provided to a gate of the second transistor T2. The first transistor T1 may be turned on when the level of the first path signal Sch1 is low. In an example, the first transistor T1 may be a p-channel field effect transistor. The second transistor T2 may be turned on when the level of the first control signal is high. In an example, the second transistor T2 may be an n-channel field effect transistor.

The second path transistor unit 2132 may include third and fourth transistors T3 and T4. The third transistor T3 may be disposed between the driving power supply Vcc and the other end of the voice coil motor 220, and the fourth transistor T4 may be disposed between one end of the voice coil motor 220 and the ground.

The second path signal Sch2 and second control signal may be provided to the second path transistor unit 2132, and the second path transistor unit 2132 may form a second path of driving power applied to the voice coil motor 220 depending on the second path signal Sch2 and the second control signal. In an example, the second path signal Sch2 is provided to a gate of the third transistor T3, and the second control signal is provided to a gate of the fourth transistor T4. In an example, the third transistor T3 is turned on when the level of the second path signal Sch2 is low. In an example, the third transistor T3 may be a p-channel field effect transistor. In an example, the fourth transistor T4 is turned on when the level of the second control signal is high. In an example, the fourth transistor T4 may be an n-channel field effect transistor.

Each of the first and second control circuits 2121 and 2122 may include a mirroring controller and a control signal blocking unit. Since configurations and operations of the first and second control circuits 2121 and 2122 are similar to each other, the first control circuit 2121 is described. The descriptions of first control circuit 2121 is also applicable to the second control circuit 2122, and are incorporated herein by reference. Thus, a detailed description of the second control circuit 2122 may not be repeated here.

The first control circuit 2121 may compare a reference current, of which a level is determined depending on the current signal, with a driving current flowing in the voice coil motor 220 to generate the control signal.

In an example, the first control circuit 2121 includes a mirroring controller 2121a and a control signal blocking unit 2121b. In an example, the mirroring controller 2121a includes a current providing transistor Tr1, a current source Is, and an operational amplifier AMP, and the control signal blocking unit 2121b includes a blocking transistor Tr2.

In an example, the current providing transistor Tr1 is disposed between the driving power supply Vcc and one end of the current source Is, and the first path signal Sch1 is provided to the gate of the current providing transistor Tr1. In an example, the current providing transistor Tr1 is a p-channel field effect transistor.

In an example, the other end of the current source Is is connected to the ground, and a connection node of the current providing transistor Tr1 and the current source Is is connected to an inverting terminal of the operational amplifier AMP. The current source Is may output the reference current so as to decrease a voltage of the inverting terminal at the time of forming a current path. In an example, a non-inverting terminal of the operational amplifier AMP is connected to a connection node between the first transistor T1 receiving the path signal and the voice coil motor 220. Potentials of the connection node between the current providing transistor Tr1 and the current source connected to the inverting terminal and the non-inverting terminal by a virtual ground of the operational amplifier AMP, respectively, and the connection node between the first transistor T1 receiving the path signal and the voice coil motor 220 may be equally maintained. Therefore, the first control circuit 2121 may equally maintain a potential difference across the current providing transistor Tr1 and a potential difference across the first transistor Ti.

In an example, an output terminal of the operational amplifier AMP is connected to the gate of the second transistor T2 of the first path transistor unit 2131. The blocking transistor Tr2 may be disposed between the output terminal of the operational amplifier AMP and the ground, and the first path signal Sch1 may be provided to a gate of the blocking transistor Tr2. In an example, the blocking transistor Tr2 may be an n-channel field effect transistor.

When the level of the first path signal Sch1 is high, the current providing transistor Tr1 and the first transistor T1 may be turned off, and the blocking transistor Tr2 may be turned on. When the blocking transistor Tr2 is turned on, a low-level ground potential is provided to the gate of the second transistor T2, the second transistor T2 may be turned off. Therefore, since the first and second transistors T1 and T2 are turned off, the first path of the driving current applied to the voice coil motor 220 is not formed.

When the level of the first path signal Sch1 is low, the current providing transistor Tr1 and the first transistor T1 may be turned on, and the blocking transistor Tr2 may be turned off.

Since the current providing transistor Tr1 is turned on, the reference current Iref of the current source Is may flow through the current providing transistor Tr1, the voltage of the inverting terminal of the operational amplifier AMP may be decreased.

Since the first transistor T1 is turned on, the non-inverting terminal of the operational amplifier AMP may have a voltage of the driving power supply Vcc. Since the voltage of the non-inverting terminal of the operational amplifier AMP is higher than that of the inverting terminal, the operational amplifier AMP may output a high-level first control signal. Since the second transistor T2 is turned on by the high-level first control signal, a first path from the first transistor T1 to the second transistor T2 through the voice coil motor 220 may be formed.

When the first path is formed and the current flows in the first transistor T1, the voltage of the non-inverting terminal of the operational amplifier AMP may be decreased, and the driving current Iout may flow until voltage levels of the non-inverting terminal and the inverting terminal of the operational amplifier AMP are equal to each other. In an example where a ratio of sizes of the current providing transistor Tr1 to the first transistor T1 is 1:M, a ratio between current levels of the reference current Iref and the driving current Iout may be 1:M. Therefore, the level of the driving current Iout may be determined by the reference current Iref, and the driving circuit unit 213 may generate the driving current Iout by mirroring the reference current Iref.

Figure 5:
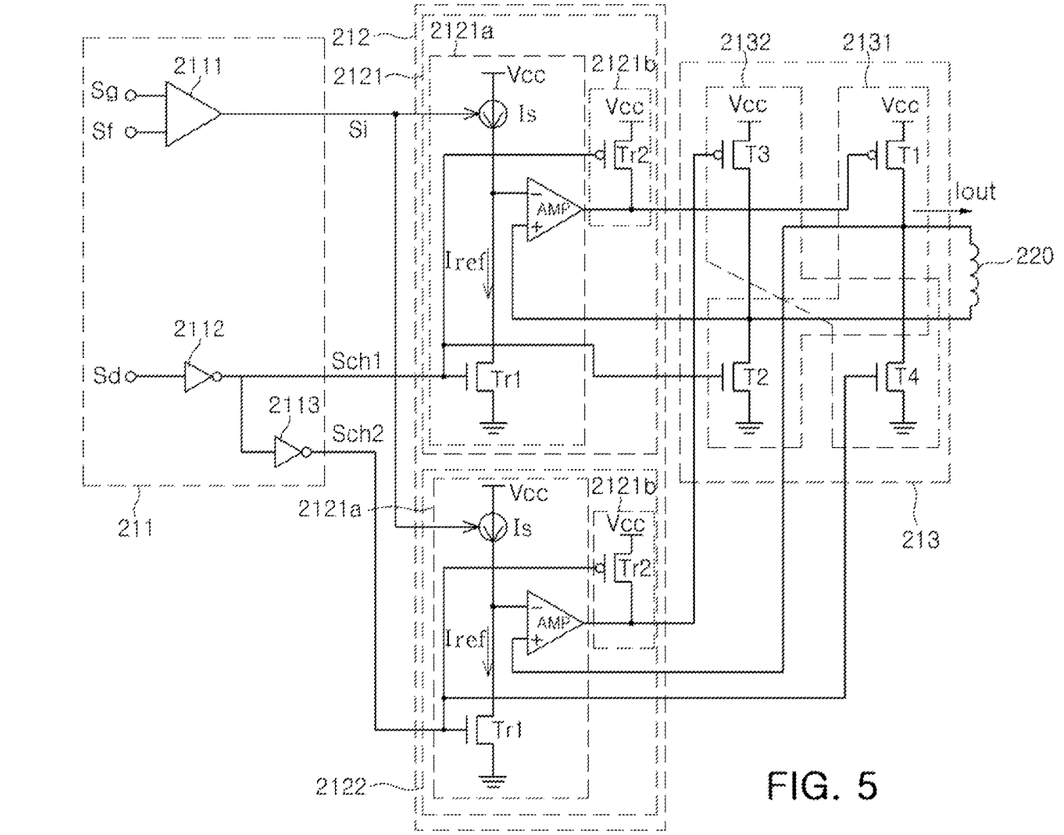
FIG. 5 is a diagram illustrating an example of a circuit diagram of a driving apparatus.

FIG. 5 is a circuit diagram illustrating an example of a driving apparatus. Since the driving apparatus of FIG. 5 is similar to the driving apparatus of FIG. 4, the descriptions FIG. 4 are incorporated herein by reference. Thus, a detailed description of contents that are the same as or overlapped with the contents described above will not be repeated.

In an example, the signal generator 211 includes a comparator 2111 and one or more inverters 2112 and 2113. In an example, the comparator 2111 compares a target signal Sg and a feedback signal Sf generated from a position detector 240 to generate a current signal Si. The current signal Si may be provided to a current source Is of first and second control circuits 2121 and 2122 as described below, thereby determining a current level of a reference current.

One or more inverters 2112 and 2113 may generate first and second path signals Sch1 and Sch2 from a direction signal Sd. In an example, the first inverter 2112 inverts the direction signal Sd to generate the first path signal Sch1, and the second inverter 2113 inverts the first path signal Sch1 to generate the second path signal Sch2. Therefore, the first and second path signals Sch1 and Sch2 may have different levels from each other. In an example, when a level of the first path signal Sch1 is high, a level of the second path signal Sch2 may be low, and in a case in which the level of the first path signal Sch1 is low, the level of the second path signal Sch2 may be high. The path signals generated in the signal generator 211 may be provided to a controller 212 and the driving circuit unit 213.

In an example, the controller 212 includes first and second control circuits 2121 and 2122. Each of the first and second control circuits 2121 and 2122 operate selectively depending on the first and second path signals Sch1 and Sch2 provided by the signal generator 211 to generate first and second control signals. The first path signal Sch1 may be provided to the first control circuit 2121, and the second path signal Sch2 may be provided to the second control circuit 2122.

In an example, when the level of the first path signal Sch1 is high, the first control circuit 2121 may generate the first control signal, and when the level of the second path signal Sch2 is high, the second control circuit 2122 may generate the second control signal. In an example, the levels of the first and second control signals may be low.

In an example, the driving circuit unit 213 includes a plurality of transistors connected to the voice coil motor 220 in an H bridge form. The driving circuit unit 213 may include a first path transistor unit 2131 and a second path transistor unit 2132.

In an example, the first path transistor unit 2131 includes first and second transistors T1 and T2. In an example, the first transistor T1 is disposed between a driving power supply Vcc and one end of the voice coil motor 220, and the second transistor T2 is disposed between the other end of the voice coil motor 220 and a ground.

In an example, the above mentioned first path signal Sch1 and first control signal is provided to the first path transistor unit 2131, and the first path transistor unit 2131 forms a first path of a driving current applied to the voice coil motor 220 depending on the first path signal Sch1 and the first control signal. In an example, the first control signal is provided to a gate of the first transistor T1, and the first path signal Sch1 is provided to a gate of the second transistor T2. The first transistor T1 may be turned on when the level of the first control signal is low. In an example, the first transistor T1 may be a p-channel field effect transistor. The second transistor T2 may be turned on when the level of the first path signal Sch1 is high. In an example, the second transistor T2 may be an n-channel field effect transistor.

In an example, the second path transistor unit 2132 includes third and fourth transistors T3 and T4. The third transistor T3 is disposed between the driving power supply Vcc and the other end of the voice coil motor 220, and the fourth transistor T4 is disposed between one end of the voice coil motor 220 and the ground.

In an example, the above mentioned second path signal Sch2 and second control signal is provided to the second path transistor unit 2132, and the second path transistor unit 2132 may form a second path of driving power applied to the voice coil motor 220 depending on the second path signal Sch2 and the second control signal. In an example, the second control signal is provided to a gate of the third transistor T3, and the second path signal Sch2 is provided to a gate of the fourth transistor T4. The third transistor T3 may be turned on when the level of the second control is low. In an example, the third transistor T3 is a p-channel field effect transistor. The fourth transistor T4 may be turned on when the level of the second path signal Sch2 is high. In an example, the fourth transistor T4 is an n-channel field effect transistor.

Each of the first and second control circuits 2121 and 2122 may include a mirroring controller and a control signal blocking unit. Since configurations and operations of the first and second control circuits 2121 and 2122 are similar to each other, the first control circuit 2121 will be primarily described below. In addition to the description of second control circuit 2122 below, the descriptions of first control circuit 2121 is also applicable to second control circuit 2122, and are incorporated herein by reference. Thus, the above description may not be repeated here.

In an example, the first control circuit 2121 compares a reference current, of which a level is determined depending on the current signal, with a driving current flowing in the voice coil motor 220 to generate the control signal.

In an example, the first control circuit 2121 includes a mirroring controller 2121a and a control signal blocking unit 2121b. In an example, the mirroring controller 2121a includes a current providing transistor Tr1, a current source Is, and an operational amplifier AMP. The control signal blocking unit 2121b may include a blocking transistor Tr2.

In an example, the current providing transistor Tr1 is disposed between the ground and one end of the current source, and the first path signal Sch1 is provided to a gate of the current providing transistor Tr1. In an example, the current providing transistor Tr1 is an n-channel field effect transistor.

In an example, the other end of the current source Is is connected to the driving power supply Vcc, and a connection node between the current providing transistor Tr1 and the current source Is is connected to an inverting terminal of the operational amplifier AMP. The current source Is may output the reference current so as to increase a voltage of the inverting terminal at the time of forming a current path. A non-inverting terminal of the operational amplifier AMP is connected to the other end of the voice coil motor 220. An output terminal of the operational amplifier AMP is connected to the gate of the first transistor T1 of the first path transistor unit 2131. The blocking transistor Tr2 is disposed between the output terminal of the operational amplifier AMP and the driving power supply Vcc, and the first path signal Sch1 is provided to a gate of the blocking transistor Tr2. In an example, the blocking transistor Tr2 is a p-channel field effect transistor.

When the level of the first path signal Sch1 is low, the current providing transistor Tr1 and the second transistor T1 may be turned off, and the blocking transistor Tr2 may be turned on. When the blocking transistor Tr2 is turned on, a high-level potential of the driving power supply is provided to the gate of the first transistor T1, the first transistor T1 may be turned off. Since the first and second transistors T1 and T2 are turned off, the first path of the driving current applied to the voice coil motor 220 is not formed.

When the level of the first path signal Sch1 is high, the current providing transistor Tr1 and the second transistor T2 may be turned on, and the blocking transistor Tr2 may be turned off.

Since the current providing transistor Tr1 is turned on, the reference current Iref of the current source Is may flow through the current providing transistor Tr1, the voltage of the inverting terminal of the operational amplifier AMP may be increased.

Since the second transistor T2 is turned on, the non-inverting terminal of the operational amplifier AMP may have a ground potential. Since the voltage of the inverting terminal of the operational amplifier AMP is higher than that of the non-inverting terminal, the operational amplifier AMP may output a low-level first control signal. Since the first transistor T1 is turned on by the low-level first control signal, a first path from the first transistor T1 to the second transistor T2 through the voice coil motor 220 may be formed.

When the first path is formed and the current flows in the first transistor T1, the voltage of the non-inverting terminal of the operational amplifier AMP may be increased, and the driving current Iout may flow until voltage levels of the non-inverting terminal and the inverting terminal of the operational amplifier AMP are equal to each other. When a ratio of sizes of the current providing transistor Tr1 to the second transistor T1 is 1:M, a ratio of current levels of the reference current Iref and the driving current Iout may be 1:M. Therefore, the level of the driving current Iout may be determined depending on the reference current Iref.

According to the examples described above, the voice coil motor may be precisely controlled by generating the driving current depending on the level of the reference current flowing in the control circuit and the ratio of the sizes of the transistor provided in the control circuit to the size of the transistor provided in the driving circuit unit.

In the driving apparatus for a voice coil motor a separate transistor and a resistor for detecting the voltage of the voice coil motor may be removed, thereby allowing for miniaturization of the camera module.

In an example, the voice coil motor may be precisely controlled by controlling the driving current depending on the reference current regardless of a load of the voice coil motor.

In an example, the driving apparatus for the voice coil motor is capable of precisely controlling the voice coil motor while allowing for the miniaturization of an actuator of a camera module.

The position detector 240, controller 212, and signal generator 211 illustrated in FIGS. 2-3 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after gaining a thorough an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A driving apparatus for a voice coil motor, comprising:
   a signal generator configured to generate a path signal determining a path of a driving current provided to the voice coil motor and a current signal determining a level of the driving current;
   a controller configured to generate a control signal by comparing a reference current determined by the current signal, with the driving current flowing in the voice coil motor; and a driving circuit unit comprising transistors connected to the voice coil motor, the transistors being configured to form the path of the driving current by performing a switching operation based on the path signal and the control signal.

2. The driving apparatus of claim 1, wherein the driving circuit unit is configured to generate the driving current by mirroring the reference current.

3. The driving apparatus of claim 1, wherein the controller comprises:
 a current providing transistor configured to perform a switching operation based on the path signal; and
 a current source configured to generate the reference current based on the switching operation of the current providing transistor.

4. The driving apparatus of claim 3, wherein a ratio of the reference current to the driving current is determined based on a ratio of a size of the current providing transistor to a size of one of the transistors.

5. The driving apparatus of claim 3, wherein the controller is further configured to uniformly maintain a potential difference across the transistor receiving the path signal among the transistors and a potential difference across the current providing transistor.

6. The driving apparatus of claim 3, wherein the controller further comprises an operational amplifier including an inverting terminal and a non-inverting terminal, and
 the inverting terminal is connected to one of the current source and the voice coil motor, and the non-inverting terminal is connected the other of the current source and the voice coil motor.

7. The driving apparatus of claim 6, wherein the operational amplifier is configured to generate the control signal based on voltages of the inverting terminal and the non-inverting terminal.

8. The driving apparatus of claim 7, wherein the controller further comprises a blocking transistor blocking the control signal by performing a switching operation based on the path signal.

9. The driving apparatus of claim 1, wherein a path of the driving current is determined by two transistors among the transistors, and
 one of the two transistors receiving the path signal, and the other transistor receiving the control signal.

10. A driving apparatus for a voice coil motor, comprising:
 a signal generator configured to generate a path signal determining a path of a driving current provided to the voice coil motor and a current signal determining a level of the driving current;
 a controller configured to generate a control signal from a reference current determined by the current signal; and
 a driving circuit unit comprising transistors connected to the voice coil motor, the transistors forming the path of the driving current by performing a switching operation based on the path signal and the control signal,
 wherein the controller is further configured to uniformly maintain a potential of a node in which the reference current flows, and a potential of a connection node between a transistor receiving the path signal among the transistors and the voice coil motor.

11. The driving apparatus of claim 10, wherein the driving circuit unit is configured to generate the driving current by mirroring the reference current.

12. The driving apparatus of claim 10, wherein the controller comprises:
 a current providing transistor configured to perform a switching operation based on the path signal; and
 a current source configured to generate the reference current based on the switching operation of the current providing transistor.

13. The driving apparatus of claim 12, wherein a ratio of the reference current to the driving current is determined based on a ratio of a size of the current providing transistor to a size of one of the transistors.

14. The driving apparatus of claim 12, wherein the controller further comprises an operational amplifier including an inverting terminal and a non-inverting terminal,
 the inverting terminal is connected to one of the current source and the voice coil motor, and the non-inverting terminal is connected the other of the current source and the voice coil motor.

15. The driving apparatus of claim 14, wherein the operational amplifier is configured to generate the control signal based on voltages of the inverting terminal and the non-inverting terminal.

16. The driving apparatus of claim 15, wherein the controller further comprises a blocking transistor performing a switching operation based on the path signal to block the control signal.

* * * * *